(12) United States Patent
Eller et al.

(10) Patent No.: US 10,113,815 B2
(45) Date of Patent: Oct. 30, 2018

(54) METHOD OF FRICTION STIR WELDING A TUBE TO AN ELEMENT USING A TUBULAR ANVIL; STRUCTURE MANUFACTURED BY THIS METHOD

(71) Applicant: Lockheed Martin Corporation, Bethesda, MD (US)

(72) Inventors: Michael R. Eller, New Orleans, LA (US); Randy J. Brown, Slidell, LA (US); Kevin John Schuengel, Bay St. Louis, MS (US)

(73) Assignee: Lockheed Martin Corporation, Bethesda, MD (US)

( * ) Notice: Subject to any disclaimer, the term of this patent is extended or adjusted under 35 U.S.C. 154(b) by 328 days.

(21) Appl. No.: 14/914,451

(22) PCT Filed: Aug. 25, 2014

(86) PCT No.: PCT/US2014/052501
§ 371 (c)(1),
(2) Date: Feb. 25, 2016

(87) PCT Pub. No.: WO2015/031245
PCT Pub. Date: Mar. 5, 2015

(65) Prior Publication Data
US 2016/0202001 A1    Jul. 14, 2016

Related U.S. Application Data

(60) Provisional application No. 61/869,847, filed on Aug. 26, 2013.

(51) Int. Cl.
*B23K 20/12*    (2006.01)
*F28F 9/18*     (2006.01)
(Continued)

(52) U.S. Cl.
CPC .............. *F28F 9/18* (2013.01); *B23K 20/122* (2013.01); *B23K 20/126* (2013.01);
(Continued)

(58) Field of Classification Search
CPC ........ F28F 9/18; F28F 9/185; F28F 2275/062; B23P 15/26; B23K 20/129; B23K 2201/14; B23K 20/122–20/128
(Continued)

(56) References Cited

U.S. PATENT DOCUMENTS 2,736,286 A    2/1956 Britton
3,052,452 A *  9/1962 Taga ..................... F22B 37/104
                                              165/173
(Continued)

FOREIGN PATENT DOCUMENTS

CN      1876307 A      12/2006
CN    101952078 A       1/2011
(Continued)

OTHER PUBLICATIONS

Notice of Reasons for Rejection for Japanese Patent Application No. 2014-525152, dated Apr. 20, 2017, 16 pages.
(Continued)

*Primary Examiner* — Kiley S Stoner
(74) *Attorney, Agent, or Firm* — Withrow & Terranova, PLLC

(57) ABSTRACT

A process that uses friction stir welding to connect a tube, for example a thin gauge tube having a wall thickness of about 2.54 mm (0.100 inch) or less, to another element, such as a tube sheet of a heat exchanger. The process employs a tubular anvil that is installed into the end of the tube and which, in one embodiment, can provide material during the friction stir welding process. After the weld is complete, the
(Continued)

weld zone between the tubular anvil and the tube is machined away and the anvil tube removed.

12 Claims, 12 Drawing Sheets

(51) Int. Cl.
 *B23P 15/26* (2006.01)
 *B23K 101/14* (2006.01)
(52) U.S. Cl.
 CPC .......... *B23K 20/128* (2013.01); *B23K 20/129* (2013.01); *B23P 15/26* (2013.01); *F28F 9/185* (2013.01); *B23K 2201/14* (2013.01); *F28F 2275/062* (2013.01)
(58) Field of Classification Search
 USPC ....................................... 228/112.1, 2.1, 183
 See application file for complete search history.

(56) References Cited

U.S. PATENT DOCUMENTS

| | | | | |
|---|---|---|---|---|
| 3,078,551 A * | 2/1963 | Patriarca | ................ | B21D 39/06 228/134 |
| 3,109,477 A | 11/1963 | Avera et al. | | |
| 3,144,710 A | 8/1964 | Hollander et al. | | |
| 4,004,125 A | 1/1977 | Hood et al. | | |
| 4,188,140 A * | 2/1980 | Clemens | .............. | B23K 33/004 285/189 |
| 4,465,129 A * | 8/1984 | Baldensperger | .... | F28D 1/05383 165/153 |
| 4,617,990 A * | 10/1986 | Franzolini | ............ | B23K 9/0288 165/173 |
| 4,706,743 A * | 11/1987 | Chalimbaud | ......... | F28F 19/002 165/134.1 |
| 4,744,505 A * | 5/1988 | Calleson | ................ | B21D 39/06 165/173 |
| 4,848,645 A * | 7/1989 | Franzolini | ............ | B23K 9/0288 165/173 |
| 4,941,512 A | 7/1990 | McParland | | |
| 4,943,001 A | 7/1990 | Meyer | | |
| 5,150,520 A * | 9/1992 | DeRisi | .................. | B21D 39/06 165/153 |
| 5,749,414 A * | 5/1998 | Damsohn | .................. | F28F 9/18 165/158 |
| 5,893,507 A | 4/1999 | Ding et al. | | |
| 7,252,138 B2 | 8/2007 | Burkhalter et al. | | |
| 7,383,975 B2 | 6/2008 | Stol et al. | | |
| 8,439,250 B2 | 5/2013 | Takeshita et al. | | |
| 9,174,301 B2 | 11/2015 | Eller et al. | | |
| 2003/0121649 A1* | 7/2003 | Seiler | ................... | B21D 53/085 165/167 |
| 2003/0201307 A1 | 10/2003 | Waldron et al. | | |
| 2004/0049915 A1 | 3/2004 | Dunand-Roux et al. | | |
| 2005/0006079 A1* | 1/2005 | Ishii | ..................... | B21D 53/085 165/173 |
| 2006/0102699 A1 | 5/2006 | Burton et al. | | |
| 2007/0102492 A1 | 5/2007 | Nelson et al. | | |
| 2008/0000625 A1* | 1/2008 | Baylis | .................... | B29C 65/02 165/173 |
| 2010/0084454 A1 | 4/2010 | Maciel | | |
| 2010/0140321 A1 | 6/2010 | Eller et al. | | |
| 2011/0127311 A1 | 6/2011 | Peterson et al. | | |
| 2013/0037601 A1 | 2/2013 | Eller et al. | | |
| 2013/0199462 A1* | 8/2013 | Bienentreu | .............. | F28F 11/02 122/235.14 |
| 2014/0262173 A1* | 9/2014 | Nagurny | .................. | F28F 9/14 165/158 |
| 2014/0311344 A1* | 10/2014 | Bossard | ............... | B01D 71/022 96/8 |
| 2017/0219299 A1* | 8/2017 | Nagurny | .................. | F28F 9/18 |
| 2017/0219300 A1* | 8/2017 | Nagurny | .................. | F28F 9/18 |
| 2018/0043483 A1* | 2/2018 | Hori | ..................... | B23K 20/122 |

FOREIGN PATENT DOCUMENTS

| | | | | |
|---|---|---|---|---|
| DE | 208570 A1 | 4/1984 | | |
| DE | 3412494 C1 | 8/1985 | | |
| DE | 4117594 A1 * | 10/1991 | .......... | B23K 20/129 |
| EP | 2072938 A2 | 6/2008 | | |
| GB | 1182111 A | 2/1970 | | |
| GB | 1303642 | 1/1973 | | |
| GB | 1310107 | 3/1973 | | |
| JP | 54118352 A * | 9/1979 | .......... | B23K 9/0288 |
| JP | 56066380 A | 6/1981 | | |
| JP | 56071595 A * | 6/1981 | ............... | F28F 9/18 |
| JP | 59202185 A2 | 11/1984 | | |
| JP | 61108482 A | 5/1986 | | |
| JP | 62037696 A * | 2/1987 | ............... | F28F 9/18 |
| JP | 63017395 A * | 1/1988 | ............... | F28F 9/18 |
| JP | H11226759 A | 8/1999 | | |

OTHER PUBLICATIONS

First Office Action for Chinese Patent Application No. 2014800550673, dated Oct. 25, 2017, 11 pages.
Decision to Grant for Japanese Patent Application No. 2014-525152, dated Oct. 31, 2017, 5 pages.
Notice of Reasons for Rejection for Japanese Patent Application No. 2014-525152, dated Jun. 28, 2016, 19 pages.
Patent Examination Report No. 1 for Australian Patent Application No. 2012294366, dated Apr. 7, 2015, 3 pages.
Notice of Acceptance for Australian Patent Application No. 2012294366, dated Apr. 1, 2016, 2 pages.
Invitation to Pay Additional Fees and Partial International Search for PCT/US2012/050183, dated Dec. 10, 2012, 6 pages.
International Search Report and Written Opinion for PCT/US2012/050183, dated Apr. 5, 2013, 14 pages.
International Preliminary Report on Patentability for PCT/US2012/050183, dated Feb. 20, 2014, 9 pages.
International Search Report and Written Opinion for PCT/US2014/052501, dated Dec. 5, 2014, 11 pages.
International Preliminary Report on Patentability for PCT/US2014/052501, dated Mar. 10, 2016, 8 pages.
Non-Final Office Action for U.S. Appl. No. 13/571,060, dated Mar. 25, 2013, 11 pages.
Final Office Action for U.S. Appl. No. 13/571,060, dated Oct. 11, 2013, 13 pages.
Advisory Action for U.S. Appl. No. 13/571,060, dated Jan. 28, 2014, 3 pages.
Non-Final Office Action for U.S. Appl. No. 13/571,060, dated Apr. 18, 2014, 15 pages.
Final Office Action for U.S. Appl. No. 13/571,060, dated Dec. 15, 2014, 14 pages.
Notice of Allowance for U.S. Appl. No. 13/571,060, dated Jun. 22, 2015, 8 pages.
Corrected Notice of Allowance for U.S. Appl. No. 13/571,060, dated Jul. 27, 2015, 5 pages.
Notice of First Office Action for Chinese Patent Application No. 201280038475.9, dated Jun. 3, 2015, 21 pages.
Notice of the Second Office Action for Chinese Patent Application No. 201280038475.9, dated Feb. 1, 2016, 11 pages.
Office Action No. 5 for Philippine Patent Application No. 1/2014/500294, dated Mar. 17, 2016, 9 pages.
Examination Report for European Patent Application No. 12748125.7, dated Apr. 24, 2018, 5 pages.
Report of Technical Exam and Search Report for Brazilian Patent Application No. BR112014002798-6, dated Apr. 30, 2018, 6 pages.
Notification of Reasons of Refusal and Search Report for Japanese Patent Application No. 2016-539003, dated May 22, 2018, 10 pages.
Second Office Action for Chinese Patent Application No. 201480055067.3, dated Jul. 12, 2018, 13 pages.
First Examination Report for Indian Patent Application No. 153/MUMNP/2014, dated Jul. 30, 2018, 7 pages.

(56) References Cited

OTHER PUBLICATIONS

Notice of Preliminary Rejection for Korean Patent Application No. 10-2014-7006260, dated Aug. 9, 2018, 13 pages.

* cited by examiner

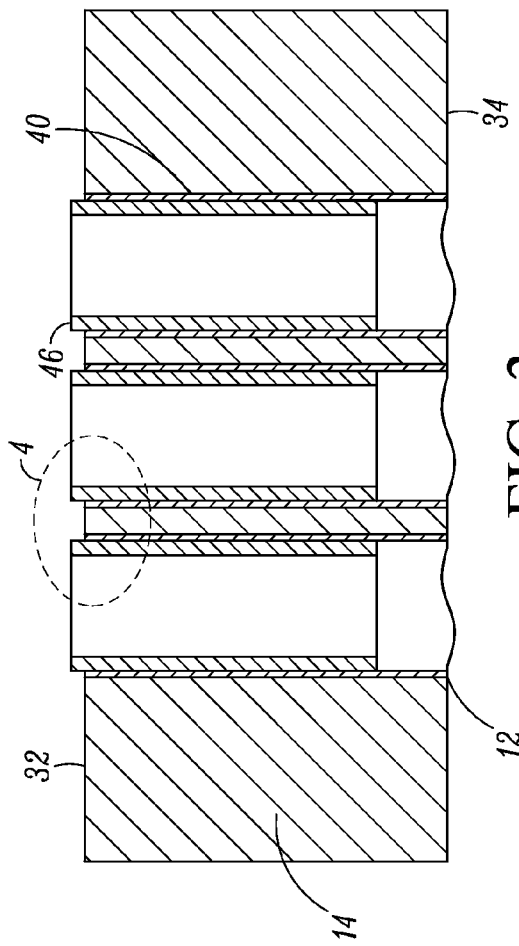
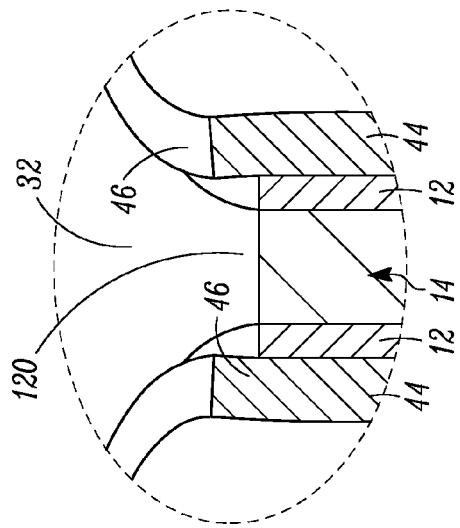
FIG. 3
FIG. 4

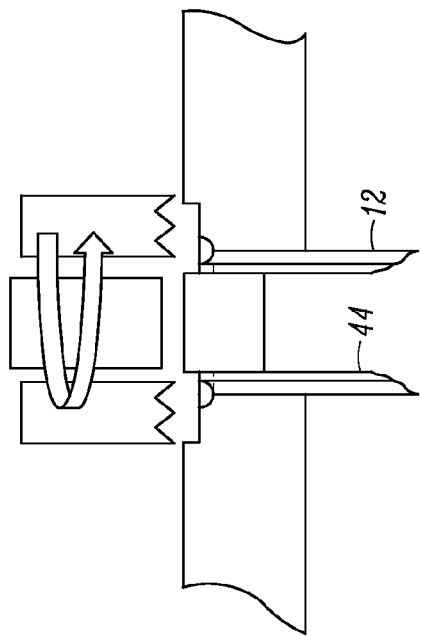
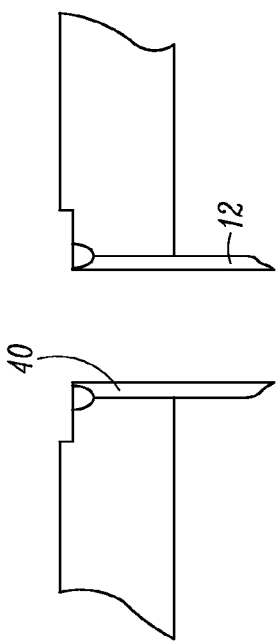
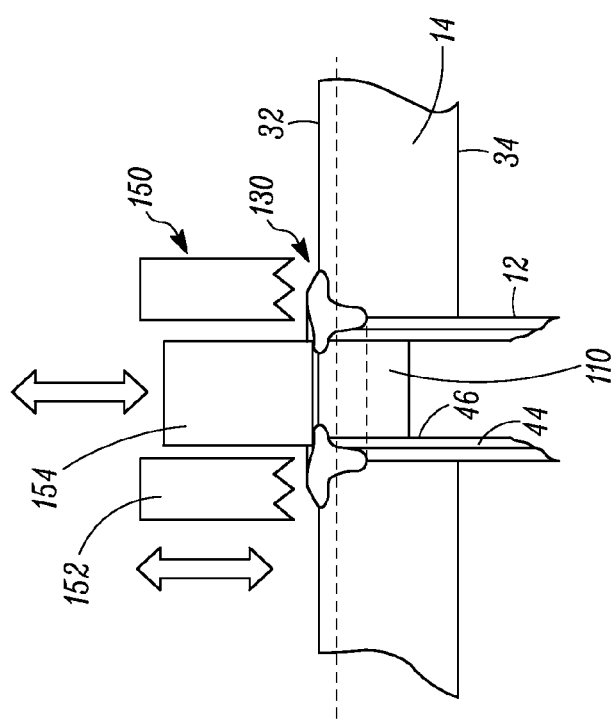
FIG. 12A
FIG. 12B
FIG. 12C

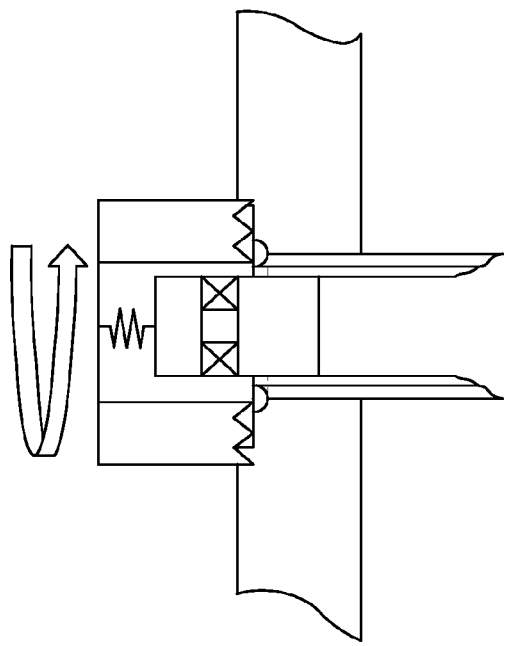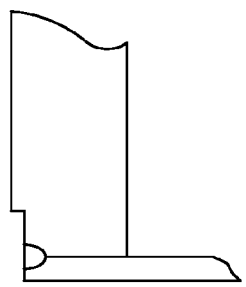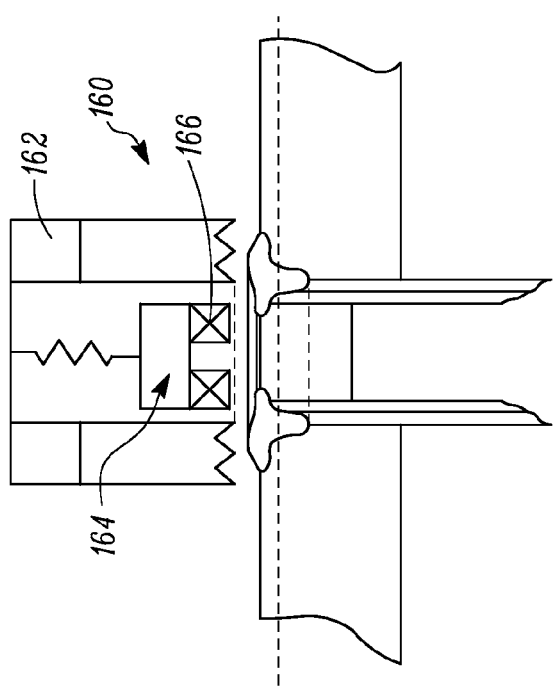
FIG. 13A
FIG. 13B
FIG. 13C

METHOD OF FRICTION STIR WELDING A TUBE TO AN ELEMENT USING A TUBULAR ANVIL; STRUCTURE MANUFACTURED BY THIS METHOD

This application is a 35 U.S.C. § 371 national phase filing of International Application No. PCT/US2014/052501 filed on Aug. 25, 2014, and further claims priority to U.S. Provisional Patent Application No. 61/869,847 filed on Aug. 26, 2013, with the disclosures of the foregoing applications hereby being incorporated by reference herein in their respective entireties.

FIELD

This disclosure relates to friction stir welding tube end joints on heat exchangers.

BACKGROUND

The friction stir welding (FSW) process is being used in a number of heat exchanger applications to connect certain elements in the heat exchanger. For example, in the FSW process as applied to shell and tube heat exchangers, a solid state welding or stirring process is used wherein the ends of tube walls are "stirred" into surrounding tube sheet material without introducing dissimilar metals and without adverse effect to metal grain structure. Examples of the FSW process in heat exchanger applications are disclosed in U.S. Pat. No. 8,439,250 and in U.S. Published Patent Application No. 2013/0037601.

Because of the unique loading factors resulting from the FSW process, FSW has only been successfully applied to tubes with a thick gauge, for example greater than about 0.100 inch wall thickness. Overall, thin gauge tubes, for example about 0.100 inch wall thickness or less, can be more desirable for heat exchangers because they save material cost and decrease thermal resistance. However, the problem of employing FSW thin gauge tubes is difficult because the geometry of the FSW weld nugget can make it difficult to retain a satisfactory weld depth and can also increase the sensitivity and cost of pre-weld and post-weld machining processes.

SUMMARY

Processes are described that use FSW to connect a tube to another element. The tube can be, for example, a tube of a heat exchanger and the element can be, for example, a tube sheet of the heat exchanger. The heat exchanger can be any type of heat exchanger design in which it is desirable to connect a tube to another element. One example of a heat exchanger in which the described process can be used includes, but is not limited to, a shell-and-tube heat exchanger. It is to be realized that the process is not limited to use with heat exchangers, and can be used in any application in which one wishes to connect a tube to another element using FSW.

The described process can be used on tubes having any wall thickness. However, the process can be used on thin gauge tubes, for example tubes having a wall thickness of about 0.100 inch or less. When the tubes are used in a heat exchanger, the tubes can carry a working fluid or a cooling fluid depending upon the heat exchanger design.

In one specifically described example process, a unique anvil technique is utilized that enables FSW tools to join thin gauge tube ends into tube sheets of a heat exchanger with maximum depth of penetration and allows for a cost-effective approach to pre-weld and post-weld preparation using tube end cutting tools.

In one embodiment, a process of connecting a tube to an element includes inserting an end of the tube into a hole in the element that extends from a first surface at a first side to a second surface at a second side of the element. The end of the tube is then immobilized with respect to the hole. A tubular anvil is then installed into the end of the tube from the first side of the element, with the tubular anvil having a flared end positioned at the first surface of the element. FSW is then employed to weld the end of the tube, the flared end of the tubular anvil, and the element at the first side of the element to intermingle material of the tube, the tubular anvil and the element. The first surface of the element is then machined to remove the friction stir weld between the end of the tube and the tubular anvil, and the tubular anvil is then removed from the tube.

In one embodiment, the material of the anvil is not intermingled with the material of the tube and the element so that the FSW weld is formed only between the tube and the element.

In another embodiment, the tube is a process tube and the element is a tube sheet of a heat exchanger, for example a shell and tube heat exchanger.

In another embodiment, a structure includes an element and a tube. The element has a first surface, a second surface, and a plurality of holes extending through the element from the first surface to the second surface. The tube has a first end and a second end, with the first end of the tube disposed in one of the holes in the element, and the tube has a thickness of about 0.100 inch or less. In addition, the first end of the tube and the element are FSW to one another at the first surface of the element.

In one embodiment, the element of the structure is a tube sheet and the tube is a process tube of a heat exchanger, for example a shell and tube heat exchanger.

DRAWINGS

FIG. 3 is a schematic depiction of a portion of the tube sheet and process tubes inserted into the tube sheet.

FIG. 4 is a close up view of the portion contained in circle 4 of FIG. 3.

FIGS. 12A, 12B, and 12C illustrate another example of a machining tool that can be used to machine the FWS weld.

FIGS. 13A, 13B, and 13C illustrate another example of a machining tool that can be used to machine the FWS weld.

Figure 14B:
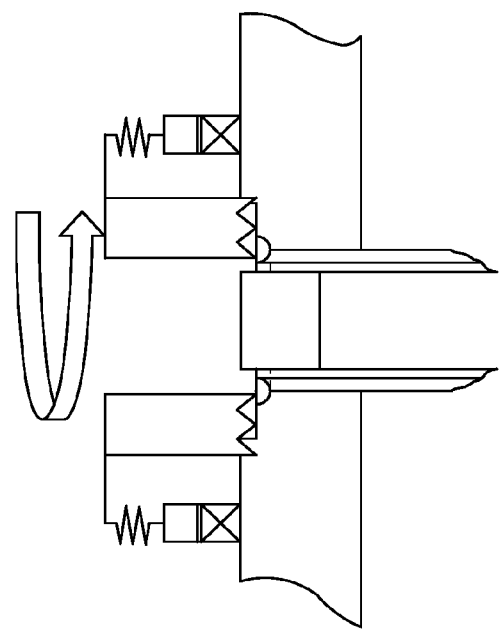
Figure 14C:
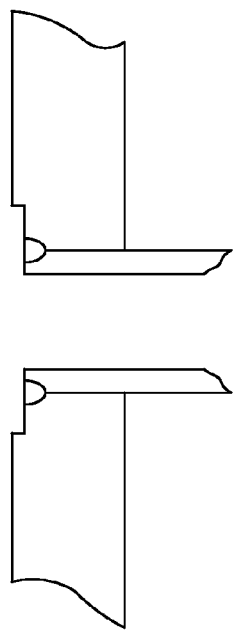
Figure 14A:
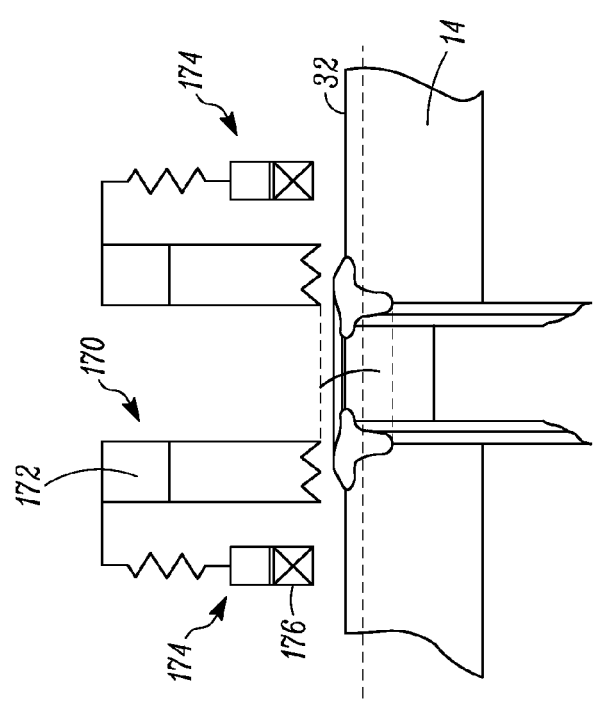

FIGS. 14A, 14B, and 14C illustrate another example of a machining tool that can be used to machine the FWS weld.

Figure 15A:
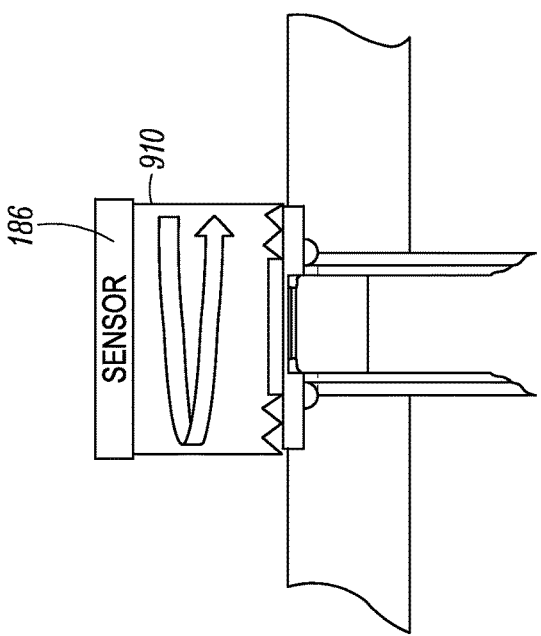
Figure 15B:
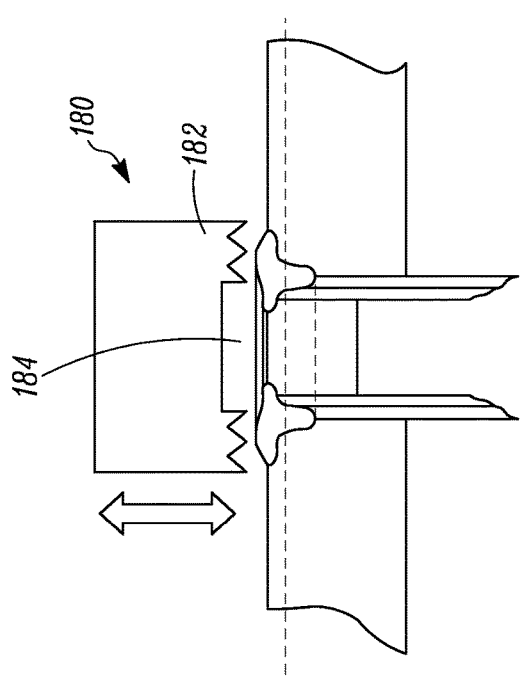
Figure 15C:
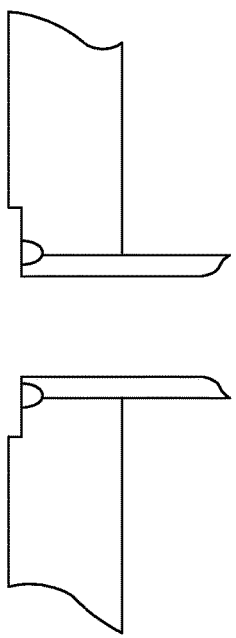

FIGS. 15A, 15B, and 15C illustrate another example of a machining tool that can be used to machine the FWS weld.

DETAILED DESCRIPTION

This description describes a process and resulting product that uses FSW to connect a tube to another element. The tube can be, for example, a tube of a heat exchanger and the element can be, for example, a tube sheet of the heat exchanger. The heat exchanger can be any type of heat exchanger design in which it is desirable to connect a tube to another element. One example of a heat exchanger in which the described process can be used includes, but is not limited to, a shell-and-tube heat exchanger. It is to be realized that the process is not limited to use with heat exchangers, and can be used in any application in which one wishes to connect a tube to another element using FSW.

Figure 1:
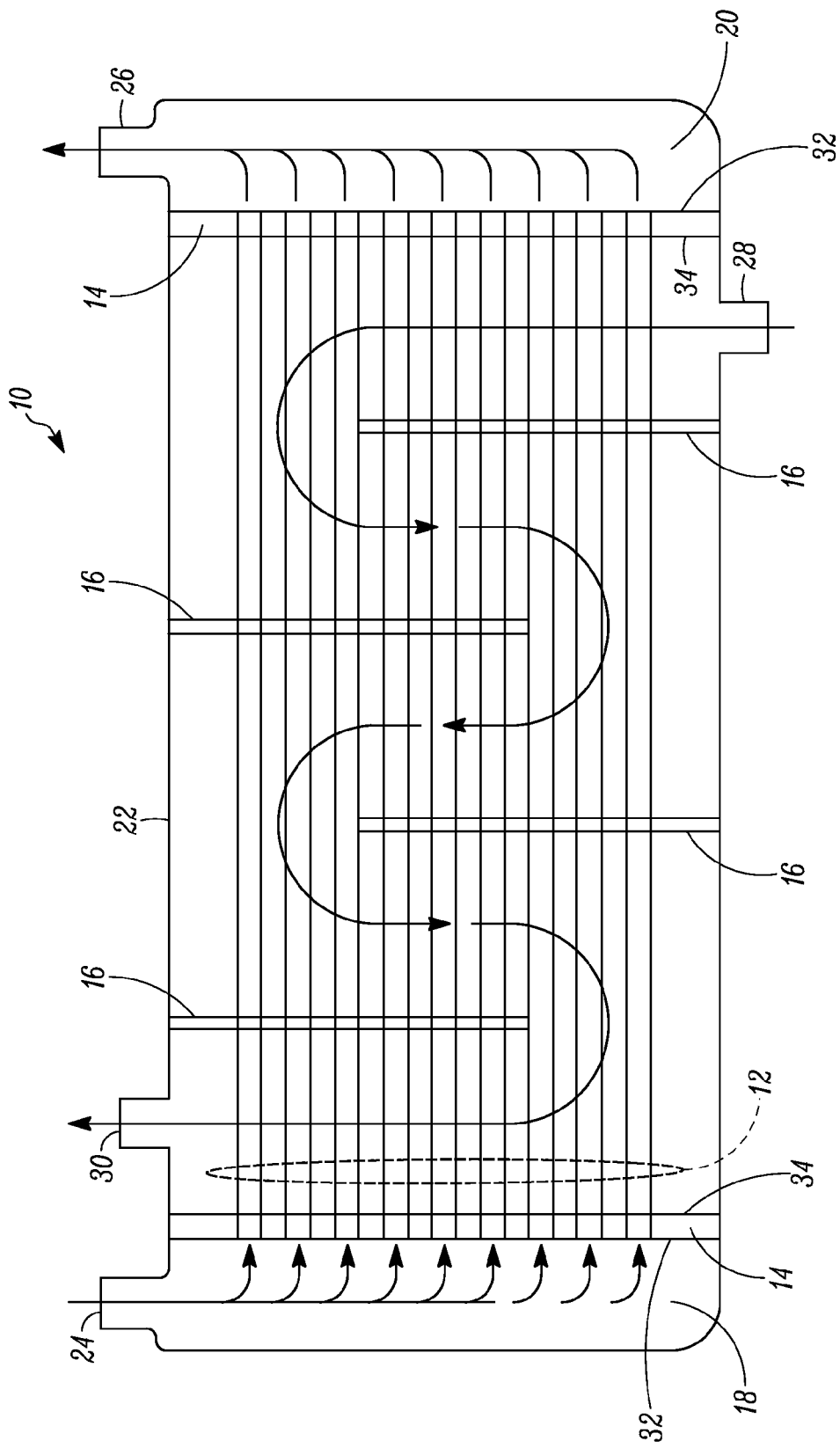
FIG. 1 is a cross-sectional view of an embodiment of a shell and tube heat exchanger to which the FSW technique described herein can be applied.

For sake of convenience, the process and product will be described with respect to a shell-and-tube heat exchanger 10 illustrated in FIG. 1. However, the heat exchanger illustrated in FIG. 1 is exemplary only. The shell-and-tube heat exchanger 10 is configured to exchange heat between a first fluid and a second fluid in a single-pass, primarily counter-flow (the two fluids flow primarily in opposite directions) arrangement. The heat exchanger 10 has a plurality of tubes 12, a tube sheet 14 at each end of the tubes, optional baffles 16, an input plenum 18 for a first fluid, an output plenum 20 for the first fluid, a shell 22 in which the tubes 12 and the tube sheets 14 are disposed, an inlet 24 in the shell 22 to the input plenum 18 for the first fluid, and an outlet 26 in the shell 22 from the output plenum 20 for the first fluid. In addition, the shell 22 includes an inlet 28 for a second fluid and an outlet 30 for the second fluid.

The first fluid and the second fluid are at different temperatures. For example, the first fluid can be at a lower temperature than the second fluid so that the second fluid is cooled by the first fluid.

During operation, the first fluid enters through the inlet 24 and is distributed by the manifold or plenum 18 into the tubes 12 whose ends are in fluid communication with the plenum 18. The first fluid flows through the tubes 12 to the second end of the tubes and into the output plenum 20 and then through the outlet 26. At the same time, the second fluid is introduced into the shell 22 through the inlet 28. The second fluid flows around and past the tubes 12 in contact with the outer surfaces thereof, exchanging heat with the first fluid flowing through the tubes 12. The baffles 16, if used, help increase the flow path length of the second fluid, thereby increasing the interaction and residence time between the second fluid in the shell-side and the walls of tubes. The second fluid ultimately exits through the outlet 30. As discussed further in U.S. Pat. No. 8,439,250, which is incorporated by reference herein in its entirety, the ends of the tubes 12 are FSW to the tube sheets 14.

Each of the tube sheets 14 is a mechanically rigid plate comprising a plurality of holes extending through the tube sheet from a first surface 32 facing the manifolds 18, 20 to a second surface 34 facing the interior of the shell 22. Each end of each tube 12 is joined to the tube sheets 14 at the holes. The tube sheets 14 and if used, the baffles 16, hold the tubes 12 in an arrangement that facilitates heat transfer between the fluid flowing along the outer surfaces of the tubes and the fluid that flows through the tubes. In one exemplary embodiment, the tubes 12 and the tube sheets 14 can be made of aluminum or alloys thereof. The tube sheets 14 can be circular, rectangular, triangular, or any other shape.

The tubes 12 can have a cross-sectional shape that is cylindrical, triangular, rectangular, or any other shape that can suitably fit into the holes in the tube sheets 14.

For many applications, such as Ocean Thermal Energy Conversion (OTEC), nuclear heat exchangers, chemical plants, and the like, it is important that the heat exchanger 10 provide excellent separation between the first and second fluids. As a result, it is important that the tubes 12 are joined with tube sheets 14 to form substantially hermetic seals. Further, in many applications, OTEC applications in particular, it is also important that these seals are substantially corrosion resistant. Therefore, it is preferred that the tubes 12 are joined with the tube sheets 14 using FSW in such a manner that the tubes and the tube sheets form seals that are both substantially hermetic and substantially corrosion resistant.

FSW is a well-known method for joining two elements of the same or differing material. Conventional FSW employs a rotating probe that is forced into the interface between the two elements. The immense friction between the probe and materials causes material in the immediate vicinity of the probe to heat up to temperatures below its melting point. This softens the adjoining sections, but because the material remains in a solid state, its original material properties are retained. Movement of the probe along the weld line forces the softened material from the two pieces towards the trailing edge causing the adjacent regions to fuse, thereby forming a weld.

As opposed to other common joining techniques, such as fusion welding, brazing, etc., FSW has several performance advantages. In particular, the resultant weld is comprised of the same material as the joined sections. As a result, galvanic corrosion due to contact between dissimilar metals at the joint can be reduced or eliminated. Furthermore, the resultant FSW weld retains the material properties of the material of the joined sections.

Although in the illustrative embodiment FSW is typically used to join two elements that are formed of the same material, in some embodiments of the present invention, FSW is used to weld elements that are formed of dissimilar materials.

Furthermore, although the illustrative embodiment comprises tubes and tube sheets that each are made of aluminum or aluminum alloy, it will be clear to one skilled in the art, after reading this specification, how to specify, make, and use alternative embodiments of the present invention wherein materials other than aluminum are used. The materials used can include any material suitable for joining a tube and tube sheet using FSW, including, without limitation, aluminum and alloys thereof, titanium and alloys thereof, stainless-steel, copper, bronze, plastics, and the like.

Figure 2:
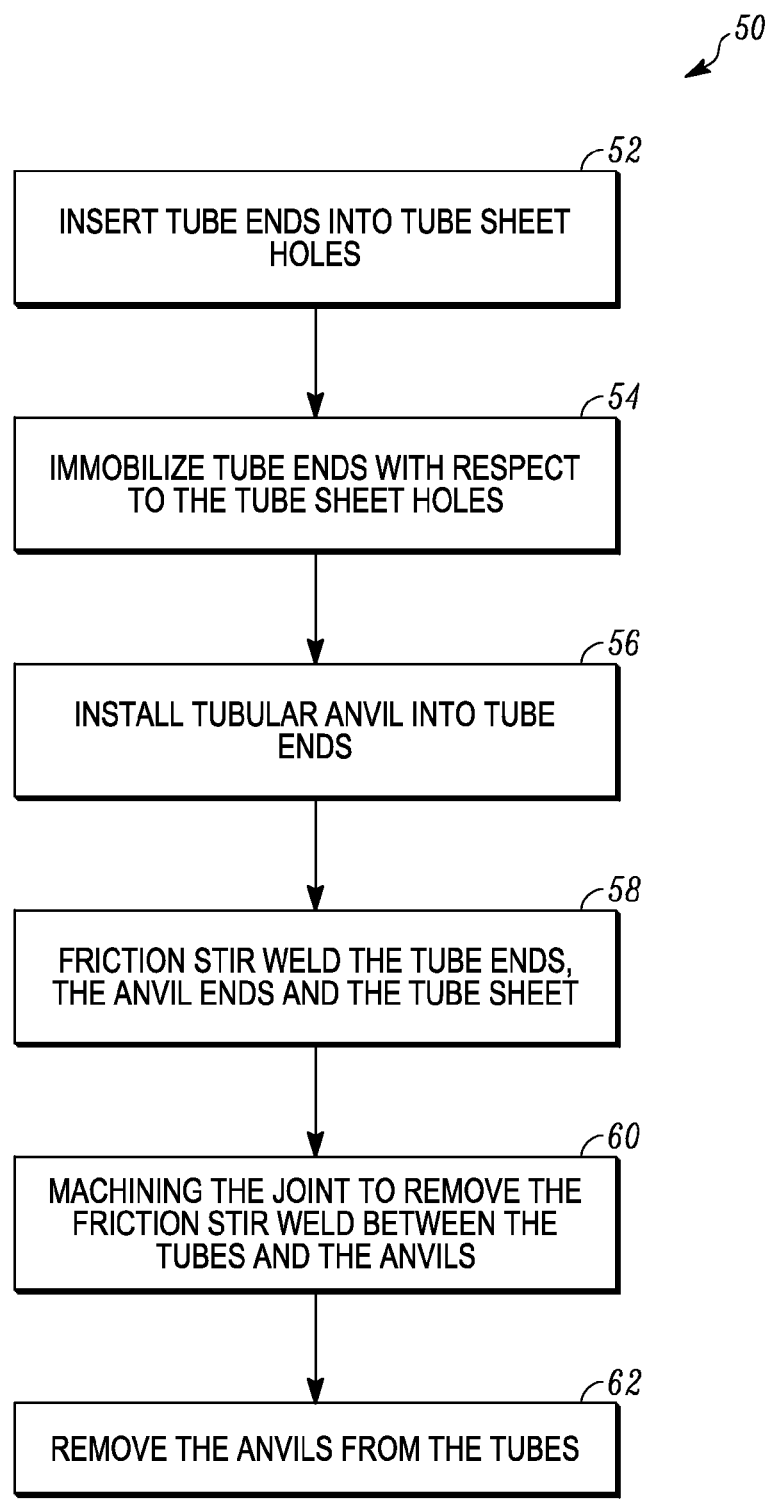
FIG. 2 is a schematic flow chart of a FSW process described herein.

Turning to FIG. 2, an example process 50 of connecting the tubes 12 to the tube sheets 14 is illustrated. Initially, first ends 40 of the tubes 12 are installed into the holes in one of the tube sheets 14. The installation process can include a step 52 of inserting the first ends 40 into the holes in the tube sheet 14. This can be seen in FIGS. 3 and 4 which illustrate an example of a plurality of the tube ends 40 inserted into the holes in the tube sheet 14. The holes extend from the first surface 32 at a first side of the tube sheet 14 to the second surface 34 at a second side of the tube sheet. After the ends 40 are inserted, the installation is completed through a step 54 of immobilizing the ends 40 of the tube 12 with respect to the holes.

The tube ends 40 can be immobilized in any manner that one finds suitable so that the tube ends 40 are fixed within the holes so that the tubes cannot be rotated relative to the holes and the tube ends cannot be easily pulled out of the holes. In some embodiments, the outer diameter of the tubes is less than the diameter of the holes to facilitate insertion of the tubes into the holes. In another embodiment, the outer diameter of the tubes is only slightly less than the diameter of the holes. It is desirable for the tubes to be inserted into the holes such that the end face of each tube is generally flush with the surface 32 in order to reduce the amount of machining in a later step described below. However, the end faces of the tubes may project slightly beyond the surface 32.

In one embodiment, the tubes are immobilized with respect to the hole by using a mechanical expander to expand the ends of the tubes that reside within the holes. When expanded, the outer diameter of each tube end 40 is substantially equal to the diameter of the holes. This forces a portion of the tube wall into contact with a portion of the sidewall forming the hole so that friction substantially immobilizes the tubes in holes. It is not necessary to expand the entire length of the tube ends 40 that are disposed within the holes, although the entire length of the tube ends could be expanded. It is to be realized that the tube ends 40 can be immobilized in any manner, not limited to mechanical expansion, that one finds suitable so that the tube ends 40 are fixed within the holes.

The opposite ends of the tubes can then be installed into the opposite tube sheet 14, or installation of the opposite ends can wait until the other steps in the process 50 are completed.

Once the tubes are installed into the tube sheet, a tubular anvil 44 is installed into the ends 40 of the tubes 12 in a step 56. With reference to FIGS. 3 and 4, the anvil installation process includes the anvils 44 being inserted into the ends 40 of the tubes 12 from the first side of the tube sheet 14. To prevent the tubular anvils from falling into the tubes 12, the anvils 44 can have a flared end 46 positioned at the first side of the tube sheet 14 so that the flared ends 46 have a diameter greater than the diameter of the rest of the anvil 44. The anvils 44 preferably have a length that is sufficient to allow a mandrel of a machining device, described further below, to lock into the inside of the anvil 44. In one non-limiting embodiment, it has been found that an anvil length of approximately 3.0-4.0 inches works adequately.

After the anvils 44 are inserted into the tube ends 40, the anvil installation is completed by press-fitting the flared ends 46 of the anvils into the ends 40 of the tubes 12. This immobilizes the anvils 44 in the tube ends 40. The press-fitting of the flared ends 46 can be achieved by, for example, using a mallet or hammer to pound on the projecting ends of the anvils 44 to force the anvils 44 further into the tube ends 40. However, any means of forcing the anvils 44 further into the tube ends 40 can be used.

Additionally, the tube ends 40 may be provided with a flared feature before inserting the anvils 44. For example, the inside diameter of the tube ends 40 can be drilled with a tapered drill bit or tapered reamer that cuts a slight taper into the tube end 40 that matches or closely matches the taper of the anvil 44. Tapering both the tube end 40 and the anvil 44 will allow the anvil 44 to fit tighter into the tube end 40 and require less force from a mallet or hammer. Furthermore, the tapered anvil 44 will cause less galling and scrapping when forced into a tapered tube end 40 versus a non-tapered tube end 40. Reducing and/or eliminating galling and scrapping of the inside of the tube ends 40 helps to avoid preferential sites for corrosion when corrosive fluids such as seawater are processed through the tubes 12.

As shown in FIGS. 3 and 4, after the anvils are installed, a portion of the flared ends 46 will project from the tubes 40 beyond the surface 32. The projecting portion of the anvils 44 and any projecting portion of the tube ends 40 can then be machined off so that the anvils and the tubes are flush with the surface 32 of the tube sheet 14.

Figure 5:
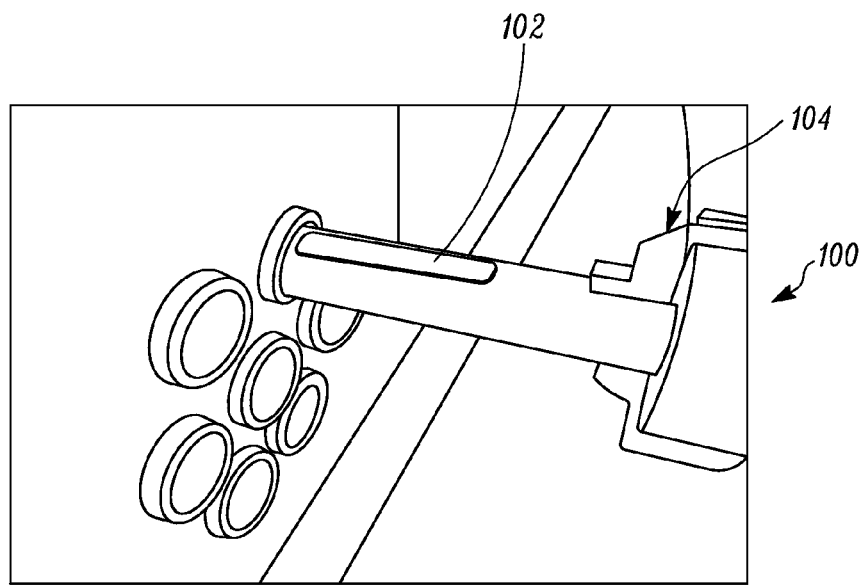
FIG. 5 depicts a mandrel of a tube end machining device being inserted into the anvil tube.
Figure 6:
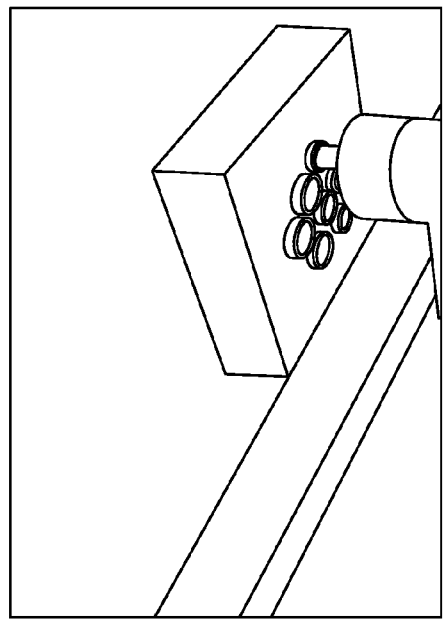
FIG. 6 depicts the mandrel fully inserted.
Figure 7:
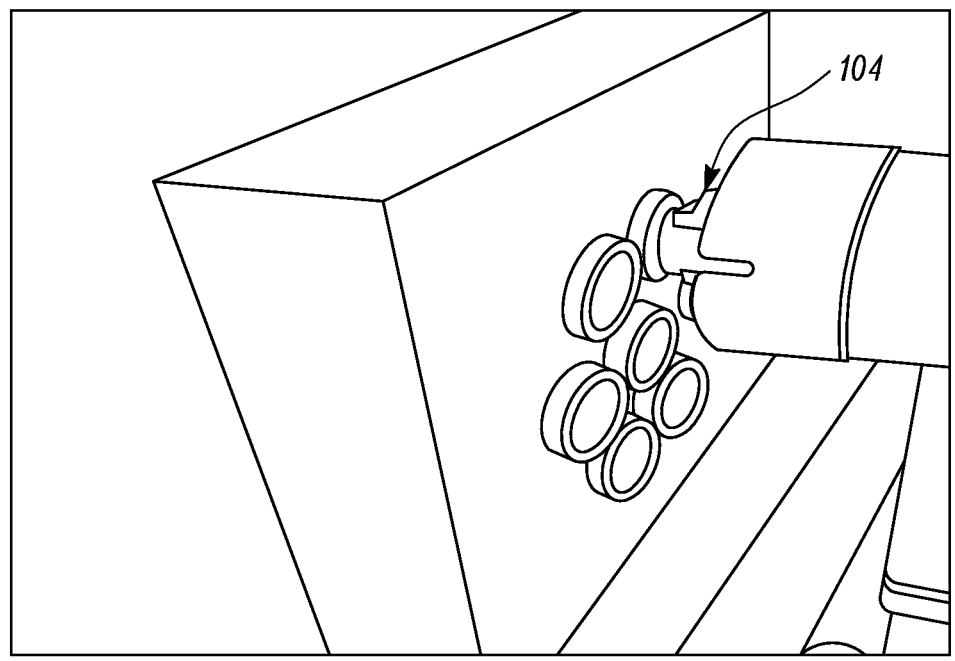
FIG. 7 depicts the machining device machining the ends of the anvil tubes.

FIGS. 5-7 illustrate an example technique of machining the anvils 44 to make them flush with the surface 32. The machining can be performed using any suitable machining device that can cut the anvils 44 (and if necessary the tubes 12) so they are flush. In the illustrated example, a machining device 100 that can be used includes a mandrel 102 that is sized to fit within the anvils 44 and that can lock onto the inside of the anvil tubes. The machining device 100 also includes a cutting device 104 that performs the actual cutting or machining of the projecting portions of the anvil tubes (and the tube ends 40) to make them planar with the surface 32. A suitable machining device of this type that can be used is the Mini K Beveling Machine available from USA GBC LLC of South Houston, Tex.

Figure 9:
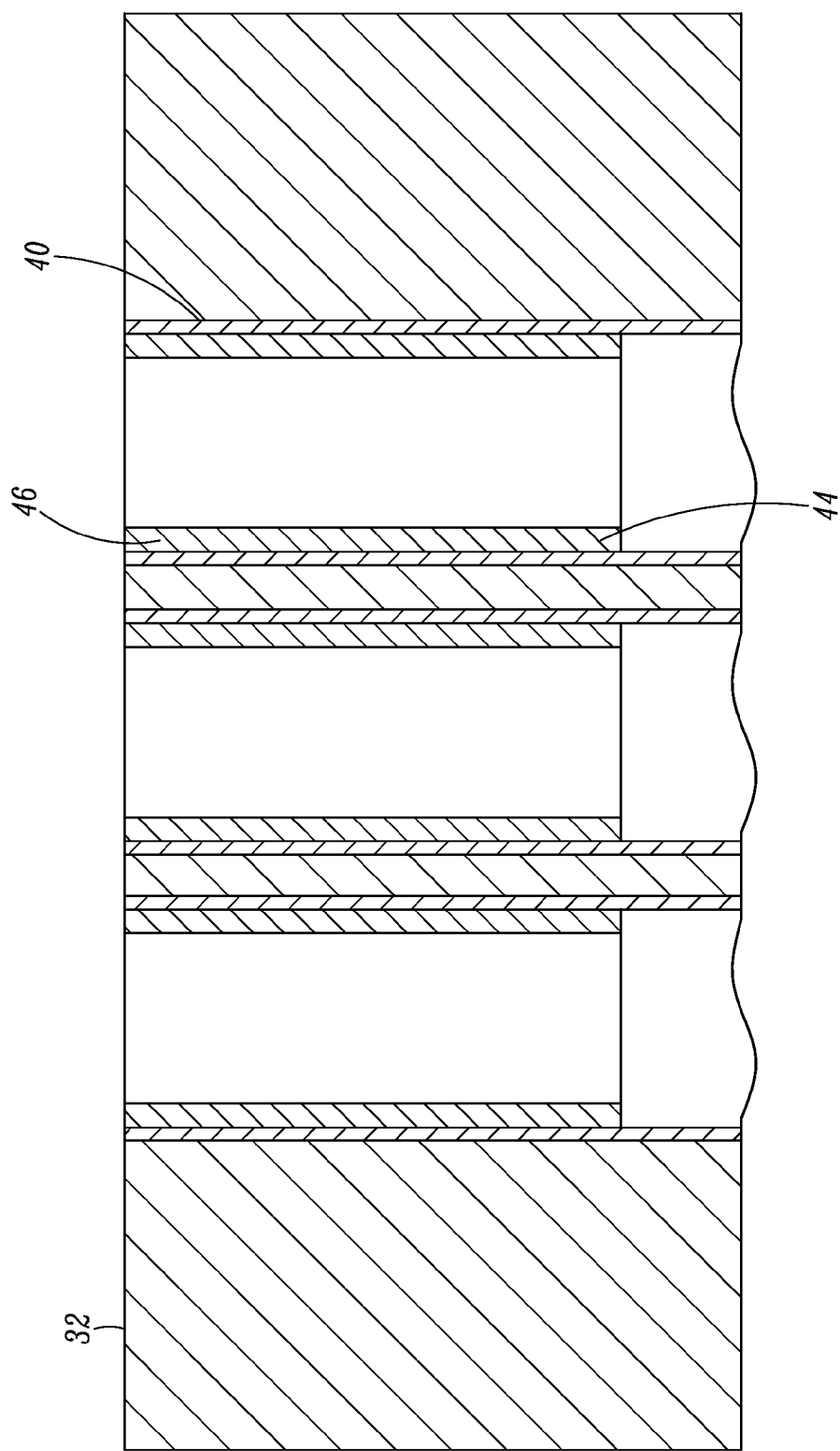
FIG. 9 is a schematic, cross-sectional depiction of the anvil tube machined flush with the end of the tube sheet.

As shown in FIGS. 5 and 6, the mandrel 102 is inserted into the anvil tube 44 and locked into place on the inside of the anvil. The drive motor is then engaged and the cutting device driven into the anvil tube end as shown in FIG. 7 until it becomes flush with the surface 32. If the tube end 40 is not already flush with the surface 32, the tube 40 is also simultaneously cut. FIG. 9 shows the flared ends 46 of the anvils 44 and the tube ends 40 being flush with the surface 32 after machining Once machining is complete, the mandrel 102 can be withdrawn and the process can proceed to FSW.

Figure 8:
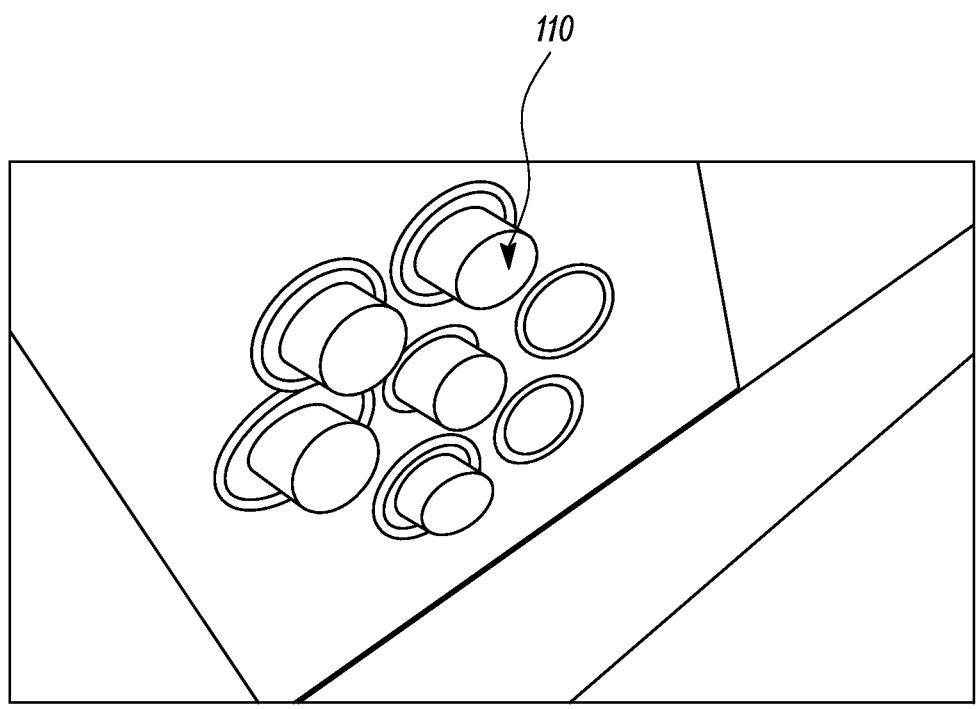
FIG. 8 depicts optional solid tapered anvils that can be inserted into the ends of the anvil tubes.

With reference to FIG. 8, in some embodiments, smaller diameter anvil tubes 44 may collapse inward from the resultant FSW load. If this occurs, an additional tapered anvil or plug 110 can be inserted into the flared end 46 of the anvil tube 44 prior to FSW to prevent the tube walls from collapsing. However, if the anvil tubes do not collapse, this step of inserting the tapered anvils 110 can be omitted. In the illustrated example, the anvils 110 are solid structures. However, any form of anvil structure can be used as long as it prevents collapse of the anvil tube 44.

Returning to FIG. 2, the end 40 of the tube 12, the flared end 46 of the tubular anvil 44, and the tube sheet 14 are then FSW at step 58 at the first surface 32 to intermingle material of the process tube, the tubular anvil and the tube sheet. The FSW process is a well-known method for joining two elements of the same or dissimilar material and need not be described in detail. Further information on the FWS process can be found in U.S. Pat. No. 8,439,250. In summary, FSW employs a rotating probe or pin that is forced into the interfaces between the tube end 40, the flared end 46, and surrounding surface 32. The immense friction between the probe and the materials causes the material in the immediate vicinity of the probe to heat up to temperatures below its melting point. This softens the adjoining sections, but because the material remains in a solid state, its original material properties are retained. Movement of the probe along the weld line forces the softened material towards the trailing edge causing the adjacent regions to fuse, thereby forming a weld. The probe will stir together the material(s) forming the tube sheet ligament 120 (i.e. the material of the tube sheet 14 located between adjacent tubes), the tube end 40, and the flared end 46 of the anvil tube 44. So the flared end 46 of the anvil tube provides added material that is used to form the weld between the tube end 40 and the tube sheet 14. If the tapered anvil 110 is used, it is preferred that the FSW pin tool does not impact the anvil 110 and material of the anvil 110 does not form part of the weld. Therefore, the anvil 110 performs a support function only and a later machining step is not required to remove the anvil 110 from the anvil tube. However, in some embodiments discussed further below, material from the anvil 110 may form part of the FSW weld and therefore the anvil may need to be part of the machining step to remove the anvil.

Figure 10:
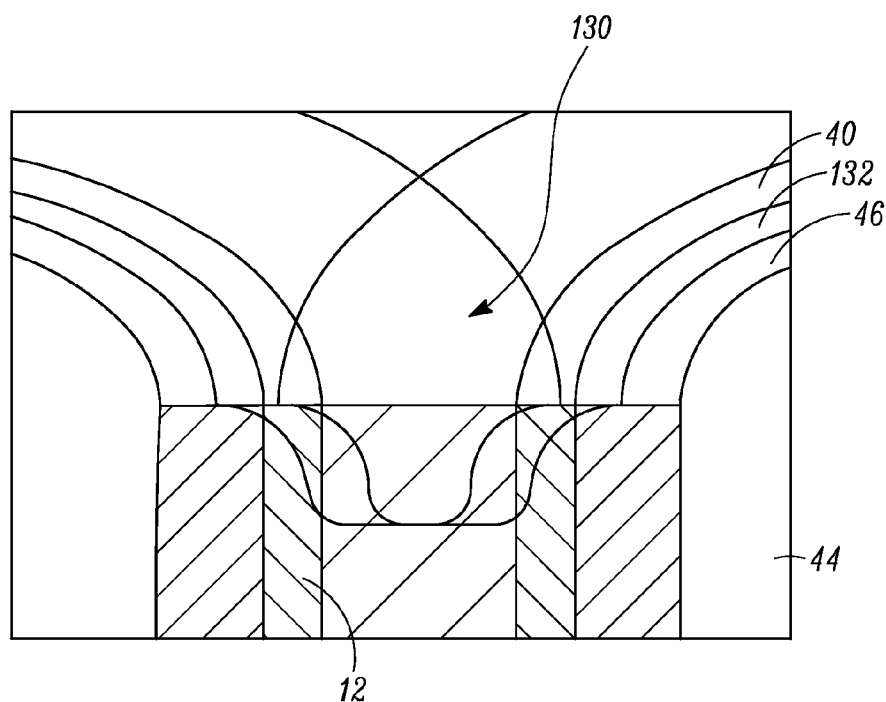
FIG. 10 is a schematic, cross-sectional isometric depiction of the result of FSW.

FIG. 10 illustrates the results of the FSW weld 130 resulting from step 58. The tube end 40 is welded at a maximum depth and the flared end 46 of the anvil tube 44 is welded with a minimum depth. A portion 132 of the weld 130 occurs between the flared end 46 and the tube end 40 which welds the anvil tube 44 to the tube 12.

Returning to FIG. 2, after completion of the FSW step 58, the process proceeds to step 60. In step 60, the first surface 32 of the tube sheet 14 is machined to remove the FSW weld 132 between the end 40 of the tube 12 and the flared end 46 of the tubular anvil 44. Machining can be performed using, for example, the machining device 100 or using a different machining device. When the machining device 100 is used, the mandrel 102 of the machining device 100 is again inserted into the tubular anvil 44 and locked into place as discussed above for FIGS. 5 and 6. The machining can include using flat cutters of the machining device 100 to machine the weld zone 130 until the weld scroll has been machined away by the flat cutters. In addition, beveled cutters of the machining device 100 can be used to bevel cut the weld zone to machine away the weld 132 between the process tube and anvil tube.

FIGS. 12A-C, 13A-C, 14A-C and 15A-C illustrate additional examples of machining tools that can be used to remove the FSW weld 132 between the end 40 of the tube 12 and the flared end 46 of the tubular anvil 44. In each of these examples, the anvil 110 is used to help support the tubular anvil 44. In one embodiment, the material of the anvil 110 does not form any part of the FSW weld zone 130 or the weld 132 and therefore the anvil 110 can be removed prior to or after machining. In another embodiment, which is depicted in FIGS. 12A-C, 13A-C, 14A-C and 15A-C, material from the anvil 110 does form part of the FSW weld zone 130 and machining is required in order to remove the anvil 110.

With reference to FIGS. 12A-C, a two-piece end mill 150 is illustrated that is used to remove the FSW between the end of the tube 12 and the flared end 46 of the tubular anvil 44. Prior to the FSW process, the anvil 110 was installed to help support the tubular anvil 44 and prevent it from collapsing during FSW. The end mill 150 includes a hollow cutter 152 that can be movable toward and away from the weld zone 130 as indicated by the arrow, and a central probe 154 disposed in a bore of the cutter that is independently movable relative to the cutter 152 toward and away from the weld zone 130 as indicated by the arrow.

The probe 154 can project past the end of the cutter 152 and touch a flat face of the anvil 110 to locate its position as shown in FIG. 12A. As shown in FIG. 12B, the probe 154 can then retract back into the bore of the cutter 152 until it is flush with the end thereof, and the cutter 152 can begin rotating and move towards the weld zone 130 while the probe 154 remains stationary. The cutter 152 can cut or machine to a predetermined depth, for example anywhere from about 0.005 inches to about 0.035 inches, from the point where the probe 154 touched the anvil 110.

Alternatively, the probe 154 can remain on the anvil 110 surface where it touched and the cutter 152 can move downward until it is flush with the probe tip and the weld zone 130. The cutter 152 can then begin rotating and cut to the predetermined depth.

After cutting takes place, both the probe 154 and the cutter 152 can retract to a designated position above the tube sheet 14, for example to a distance about 0.005 inches to about 0.050 inches above the tube sheet, and translate to the next tube sheet hole to repeat the process.

As shown in FIG. 12C, after cutting, the anvil 110 and the tubular anvil 44 can be removed from the end 40 of the tube 12.

FIGS. 13A-C illustrate a two-piece end mill 160 with a cutter 162 that is similar to the cutter 152. However, instead of a probe, a spring-loaded or dampening sensor 164 is disposed in the bore of the cutter 162. The sensor 164 is configured to find the location of the anvil 110 surface and can be compressed into the bore of the cutter 162 when the cutter 162 engages the weld zone 130 and begins machining. The end of the sensor 164 can include a bearing 166 that rotates on the anvil 110 during rotation of the cutter 162. The distance of travel or compression of the sensor 164 determines and controls the depth of the cut by the cutter 162. FIG. 13A shows the end-mill 160 being moved downward so that the sensor 164 can engage the anvil 110. FIG. 13B shows the sensor 164 engaged with the anvil 110 and the cutter 162 rotating during machining FIG. 13C shows after cutting, with the end mill 160 removed so that the anvil 110 and the tubular anvil 44 can be removed from the end 40 of the tube 12.

FIGS. 14A-C illustrate another two-piece end mill 170 with a cutter 172 that is similar to the cutter 152. In this embodiment, the end mill 170 includes at least one external depth finder or sensor 174 rigidly attached thereto that functions similarly to the sensor 164 in FIGS. 13A-C. The depth finder 174 includes a bearing 176 that rotates on the surface 32 of the tube sheet 14 during rotation of the cutter 172. In another embodiment, the end mill 170 includes a plurality of the depth finders 174, for example three of the depth finders 174, that are equally circumferentially spaced around the cutter 172. FIG. 14A shows the end-mill 170 being moved downward so that the depth finder(s) 174 can engage the tube sheet 14. FIG. 14B shows the depth finder 174 engaged with the tube sheet 14 and the cutter 172 rotating during machining FIG. 14C shows after cutting, with the end mill 170 removed so that the anvil 110 and the tubular anvil 44 can be removed from the end 40 of the tube 12.

FIGS. 15A-C illustrate an example of a one piece end mill 180 that is movable toward and away from the weld zone as indicated by the arrow. The end mill 180 includes a cutter 182 that functions like the cutters 152, 162, 172. The end mill 180 also includes a recess 184 to accommodate the anvil 110 during machining. To locate the tube sheet 14 and control the depth of machining, the end mill 180 also includes one or more sensors 186 each of which functions as a depth stop. The sensor 186 functions using load feedback, pneumatic sensing, electrical sensing, magnetic sensing, or the like. The sensor 186 is used to control the depth of cutting, with cutting being stopped once the sensor setting is reached. FIG. 15A shows the end-mill 180 being moved downward to engage the tube sheet 14. FIG. 15B shows the cutter 182 rotating and being withdrawn upward after completion of machining once the desired depth has been reached. FIG. 15C shows after cutting, with the end mill 180 removed so that the anvil 110 and the tubular anvil 44 can be removed from the end 40 of the tube 12.

Figure 11:
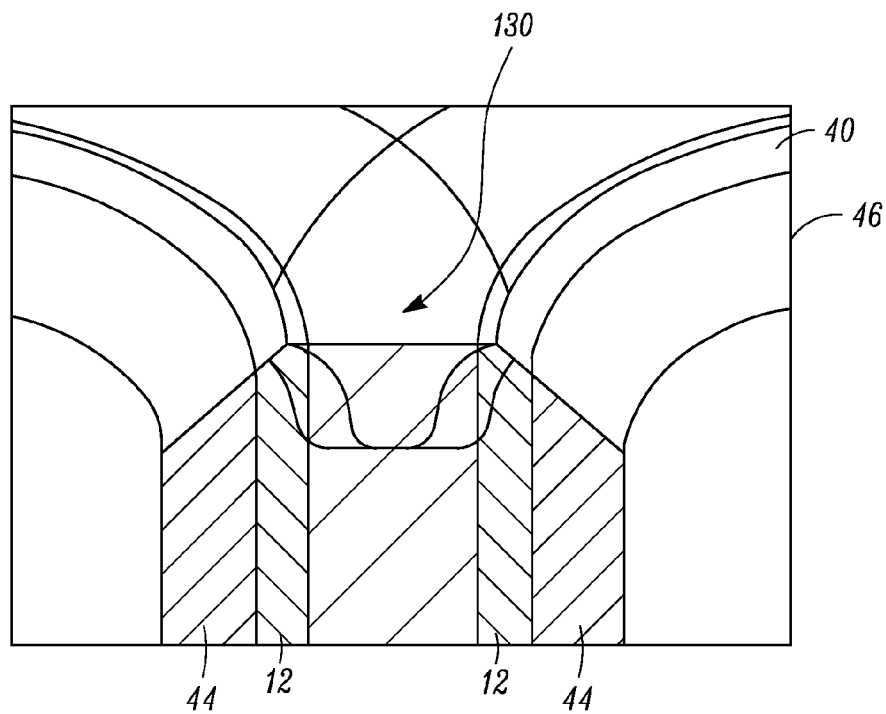
FIG. 11 is a schematic, cross-sectional isometric depiction of a bevel cut on the FSW zone.

FIG. 11 illustrates the FSW weld 130 after the machining of step 60 using any of the machining techniques described herein. The flared end 46 and the tube end 40 are beveled. The weld 132 has been machined away so that the flared end 46 and the tube end 40 are no longer welded together.

Returning to FIG. 2, after the machining step 60, the anvils 44 are removed from the tubes 12 in step 62. The anvils 44 can be removed in any manner one finds suitable. For example, the anvil tubes 44 can be removed with a pull hammer or pushed out of the tubes 12 with a rod from the opposite end of the tubes 12. Removal is possible because the FSW weld between the anvils 44 and the tubes 12 have been removed which permits removal by overcoming the press-fit force between the remaining flared ends 46 and the tube ends 40.

In another embodiment, when the tube wall thickness is about 0.100 inch or larger, the anvil tube 44 does not need to be machined off until it is flush with the surface of the tube sheet. A wall thickness of 0.100 inch or larger could have enough weld land to join the tube 12 to the tube sheet with sufficient weld depth. In this embodiment, the anvil tube 44 can still be forced into the tube end 40 as described above to prevent the process tube wall from collapsing. However, the anvil tube can remain projected from the surface of the tube sheet. The FSW pin tool will translate around the projected anvil tube without interfering or engaging with the anvil tube or dislodging it from the process tube. After the FSW has been completed, the anvil tube may be removed with a hammer or slide hammer without machining it free. After the anvil tube is removed, the FSW scrolls can be machined using the machining device as described above. Additionally, the process tubes 12 can still be machined as discussed above with a beveling cutter to leave a chamfered entrance to the process tubes.

The machining device 100 and the end mills 150, 160, 170, 180 can be operated by a machine, for example computer numeric controlled (CNC), programmable, and/or automated machinery, or they can be operated manually by use of semi-automatic and/or automatic power tools.

In one embodiment, a process of connecting a process tube to a tube sheet includes inserting an end of the process tube into a hole in the tube sheet that extends from a first surface at a first side to a second surface at a second side of the tube sheet. The end of the process tube is then immobilized with respect to the hole. A tubular anvil is then installed into the end of the process tube from the first side of the tube sheet, the tubular anvil having a flared end positioned at the first side of the tube sheet. The end of the process tube, the flared end of the tubular anvil, and the tube sheet are then FSW at the first side of the tube sheet to intermingle material of the process tube, the tubular anvil and the tube sheet. A machining device is then used to machine the first surface of the tube sheet to remove the friction stir weld between the end of the process tube and the tubular anvil, and then the tubular anvil is removed from the process tube.

In another embodiment, a process of connecting a tube to an element includes inserting an end of the tube into a hole in the element that extends from a first surface at a first side to a second surface at a second side of the element. The end of the tube is then immobilized with respect to the hole. A tubular anvil is then installed into the end of the tube from the first side of the element, the tubular anvil having a flared end positioned at and projecting from the first surface of the element. The end of the tube and the element are then FSW at the first side of the element to intermingle material of the tube and the element while translating around the projected flared end of the tubular anvil without intermingling the material of the tubular anvil with the tube and element. The tubular anvil is then removed from the tube, and the first surface of the element is machined to remove a friction stir weld scroll on the end of the tube and the element.

In an embodiment, a heat exchanger includes a tube sheet having a first surface, a second surface, and a plurality of holes extending through the tube sheet from the first surface to the second surface. A process tube having a first end and a second end is secured to the tube sheet, and the first end of the process tube is disposed in one of the holes in the tube sheet, and the process tube has a thickness of about 0.100 inch or less. The first end of the process tube is friction stir welded to the tube sheet at the first surface of the tube sheet.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A process of connecting a tube to an element, comprising:
    inserting an end of the tube into a hole in the element that extends from a first surface at a first side to a second surface at a second side of the element;
    immobilizing the end of the tube with respect to the hole;
    installing a tubular anvil into the end of the tube from the first side of the element, the tubular anvil having a flared end positioned at the first surface of the element;
    friction stir welding the end of the tube, the flared end of the tubular anvil, and the element at the first side of the element to intermingle material of the tube, the tubular anvil and the element;
    machining the first surface of the element to remove the friction stir weld between the end of the tube and the tubular anvil; and
    removing the tubular anvil from the tube.

2. The process of claim 1, wherein the element is a tube sheet of a heat exchanger, the tube is a process tube of the heat exchanger, and the process tube has a thickness of about 0.100 inch or less.

3. The process of claim 1, installing includes inserting the tubular anvil into the end of the tube, and thereafter applying force to the tubular anvil to create a press fit between the tubular anvil and the tube with a portion of the flared end extending beyond the first surface of the element.

4. The process of claim 3, wherein machining includes using a machining device having a mandrel, and installing further includes inserting the mandrel of the machining device into the tubular anvil, and using the machining device to machine the portion of the flared end of the tubular anvil that extends beyond the first surface of the element to make the flared end flush with the first surface of the element.

5. The process of claim 1, wherein immobilizing the end of the tube comprises mechanically expanding the end of the tube.

6. The process of claim 1, wherein after installing the tubular anvil and prior to friction stir welding, installing a solid tapered anvil into the tubular anvil to prevent collapse of the tubular anvil during the friction stir welding.

7. The process of claim 1, wherein machining includes using a machining device having a mandrel, and machining the first surface includes inserting the mandrel of the machining device into the tubular anvil.

8. The process of claim 1, wherein machining the first surface of the element includes machining the first surface using a two-piece end mill.

9. The process of claim 8, wherein the two-piece end mill includes a cutter with a center bore, the cutter is movable toward and away from the first surface of the element, and the two-piece end mill further includes a probe disposed in the center bore that is movable independently of the cutter toward and away from the first surface of the element.

10. The process of claim 8, wherein the two-piece end mill includes a cutter with a center bore, the cutter is movable toward and away from the first surface of the element, and the two-piece end mill further includes a spring-loaded sensor disposed in the center bore.

11. The process of claim 8, wherein the two-piece end mill includes a cutter with a center bore, the cutter is movable toward and away from the first surface of the element, and the two-piece end mill further includes at least one depth finder that is rigidly attached to the two-piece end mill at a location external to the center bore.

12. The process of claim 1, wherein machining the first surface of the element includes machining the first surface using a one-piece end mill with a cutter that is movable toward and away from the first surface of the element, and the one-piece end mill further includes at least one depth stop sensor that controls depth of penetration of the cutter into the first surface of the element.

\* \* \* \* \*